(12) United States Patent
Savage, Jr.

(10) Patent No.: US 6,264,376 B1
(45) Date of Patent: Jul. 24, 2001

(54) OPTICAL COUPLING OF LIGHT PIPES

(76) Inventor: John M. Savage, Jr., 538-B Via De La Valle, Solana Beach, CA (US) 92075

( * ) Notice: Subject to any disclaimer, the term of this patent is extended or adjusted under 35 U.S.C. 154(b) by 0 days.

(21) Appl. No.: 09/188,279

(22) Filed: Nov. 9, 1998

(51) Int. Cl.[7] .................................................. G02B 6/42
(52) U.S. Cl. ................................ 385/88; 385/92; 385/93; 385/33
(58) Field of Search ................................ 356/88, 92, 39, 356/31; 385/60–63, 78, 79, 81, 88, 92, 93, 133, 147, 31, 33–35, 36, 37

(56) References Cited

U.S. PATENT DOCUMENTS

| 5,495,545 | * | 2/1996 | Cina et al. ............................. 385/92 |
| 5,533,159 | * | 7/1996 | Okochi et al. ......................... 385/93 |
| 5,548,676 | * | 8/1996 | Savage, Jr. ............................. 385/92 |
| 5,818,995 | * | 10/1998 | Savage, Jr. ............................. 385/92 |

* cited by examiner

Primary Examiner—Frank G. Font
Assistant Examiner—Michael P. Mooney
(74) Attorney, Agent, or Firm—William W. Haefliger

(57) ABSTRACT

A light transmission device, comprising in combination a longitudinally axially extending light pipe having opposite ends, one of the ends defining a recess for reception of light source structure that transmits light into the light pipe.

24 Claims, 3 Drawing Sheets

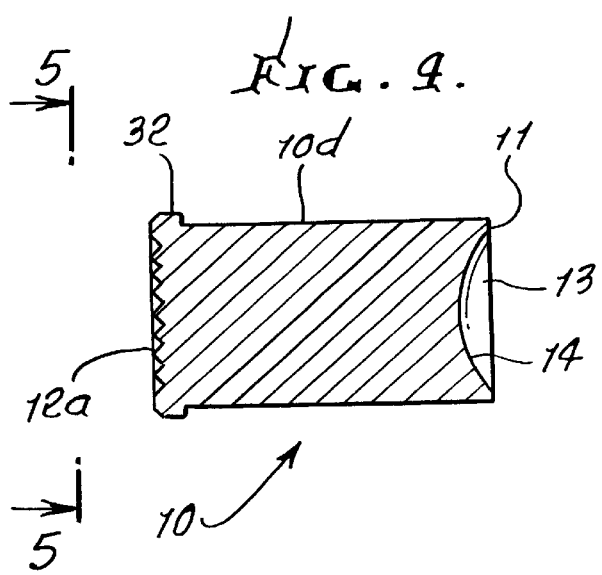
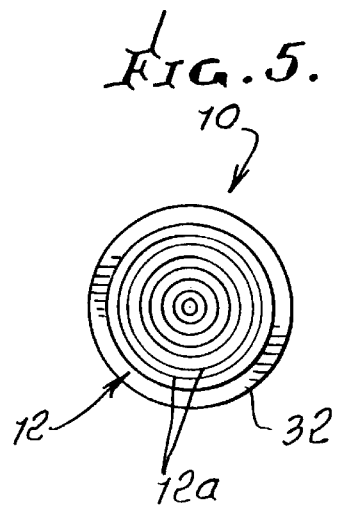
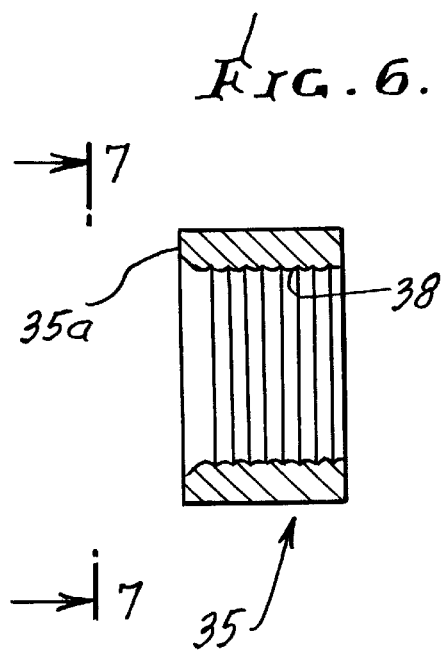
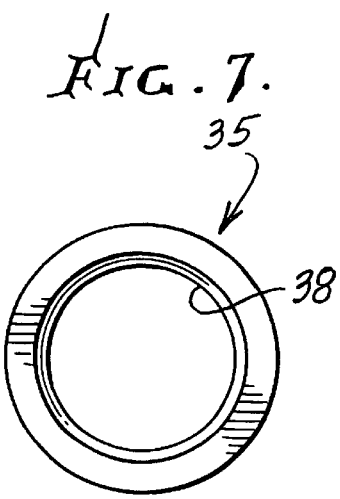

OPTICAL COUPLING OF LIGHT PIPES

BACKGROUND OF THE INVENTION

This invention relates generally to optical coupling of light sources and light pipes; and more particularly concerns endwise optical coupling of LEDs to fiber optics light pipes in a simple and effective manner to maintain their coaxial relationship during light transmission from the LED to the light pipe, as will appear.

There is need for improvements in apparatus, and methods, to overcome difficulties in optical coupling as between light sources and light pipes; and there is need to improve light transmission between and by these elements.

SUMMARY OF THE INVENTION

It is a major object of the invention to provide improvements in such optical coupling, as will meet the referenced need.

Basically, a light transmission device that will meet such need comprises, in combination:

a) a longitudinally axially extending light pipe having opposite ends, b) one of said ends defining a recess for reception of light source structure that transmits light into the light pipe.

As will appear, the recess may typically be dished, and define a concavely curved inner wall via which light is transmitted into the light pipe. Further, the light source may typically have a portion thereof received into the recess whereby the recess defines a perimeter extending about the light source. The light source may be attached, as by surface mounting, to a printed circuit board, and the light pipe end recess typically defines a perimeter that projects toward said board, sidewardly of the light source which comprises an LED.

It is another object of the invention to provide light transmitting and diverging facets at the opposite end of the light pipe. The facets may extend in substantially circular arcs.

A further object includes provision of a support panel carrying the light pipe, in spaced relation to said recess. The faceted opposite end of the light pipe typically terminates proximate the panel, and a pipe flange engages one side of the panel. A grip ring may be provided for gripping the light pipe and engaging the opposite side of the panel.

The method of positioning a light pipe and light source, in accordance with the invention, includes the steps a) providing a panel, b) assembling the light pipe to the panel to project through an opening in the panel, c) and assembling the light pipe and light source so that the light source projects into an end portion of the light pipe in spaced relation to the panel.

A recess is typically provided at an end of the light pipe, and the method includes assembling the light pipe and light source to receive a portion of the light source into said recess. That recess is typically formed to provide a concave inner wall that engages and centers the light source, such as an LED, in optically coupled relation to the light pipe.

These and other objects and advantages of the invention, as well as the details of an illustrative embodiment, will be more fully understood from the following specification and drawings, in which:

DRAWING DESCRIPTION

FIG. 4 is an enlarged section showing a light pipe incorporating the invention;

FIG. 5 is an end view taken on lines 5—5 of FIG. 4;

FIG. 6 is an enlarged axial section taken through a grip ring employed to retain the light pipe to a mounting panel;

FIG. 7 is an end view taken on lines 7—7 of FIG. 6; and

DETAILED DESCRIPTION

FIGS. 1–6 show a light pipe or fiber optics cable 10 of relatively short axial length between its opposite ends 11 and 12. End 11 defines a recess 13 for reception of light source structure that transmits light endwise into the light pipe.

Figure 1:
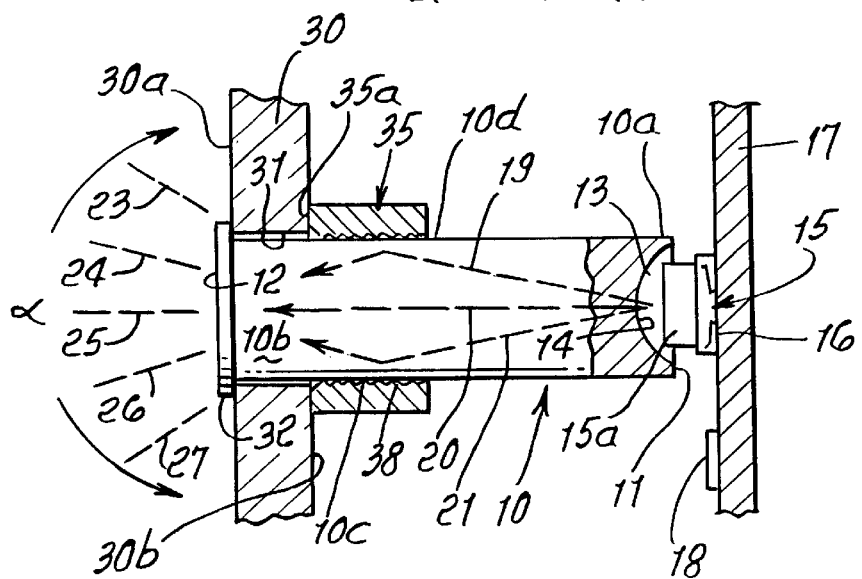
FIG. 1 is an elevation taken in section to show positioning of the light pipe relative to a light source such as an LED, and with a panel supporting the light pipe.
Figure 2:
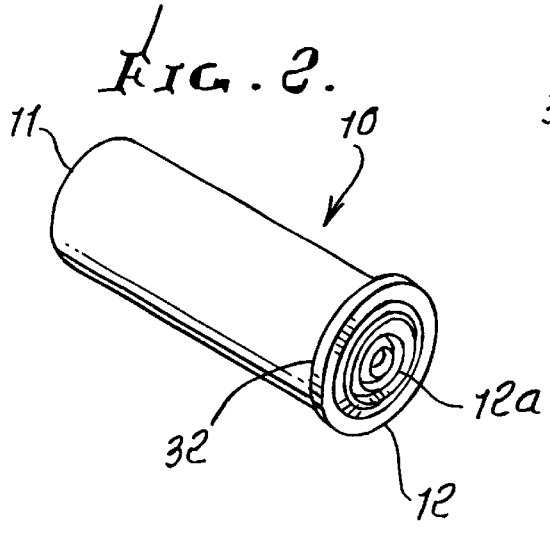
FIG. 2 is a perspective view showing one end of the light pipe.
Figure 3:
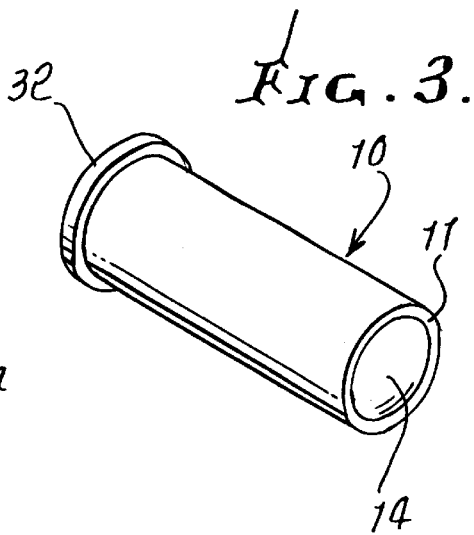
FIG. 3 is a perspective view showing the opposite end of the light pipe.
Figure 8:
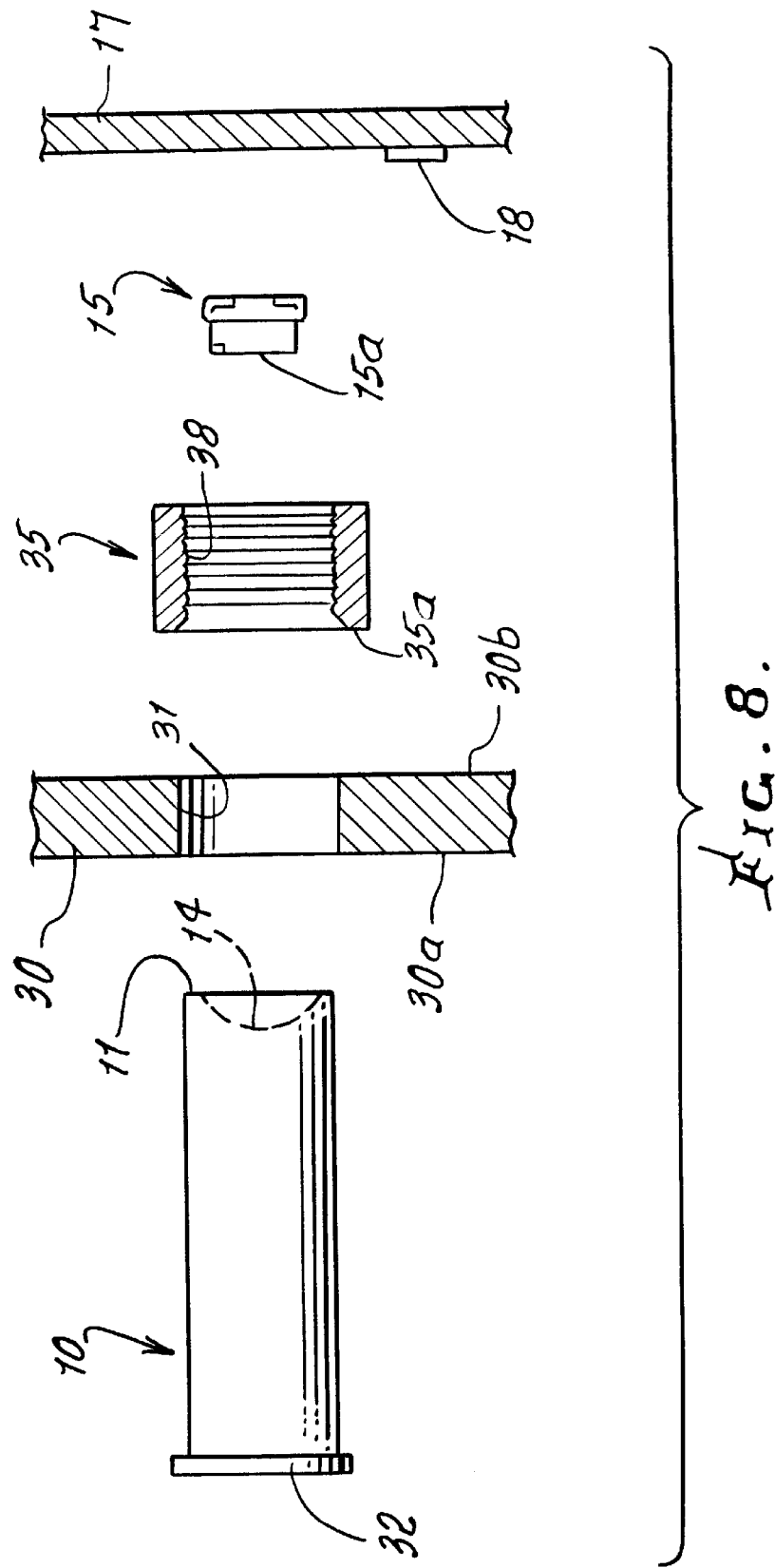
FIG. 8 is an axially exploded view showing elements as also seen in FIG. 1.

In the example, the recess may typically and advantageously define a dished inner wall 14 which may be concavely curved. That wall positions the light source 15 shown as an LED, and having an end portion 15a received into the recess, with light pipe perimeter 10a extending about the LED. Dished wall 14 may also axially mutually center the light pipe and the light source, as seen in FIG. 1. The LED 15 also shown as surface mounted at 16 on the printed circuit board 17, which also typically carries other circuitry, shown at 18, for example. Light rays from the LED pass into the light pipe and travel generally axially, as indicated at 19–21. The light pipe perimeter 10 a projects toward the circuit board.

The opposite end 12 of the cylindrical light pipe may advantageously define light transmitting facets shown as extending in circular arcs at 12a, in FIG. 5. Light is transmitted by the facets as indicated by rays 23–27, within a cone. Cone angularity α may advantageously be about 120°.

FIG. 1 shows a support panel 30 carrying the forward end extent 10b of the light pipe in endwise spaced relation to recess 13. End extent 10b typically projects through an opening 31 in that panel, with pipe faceted end 12 located proximate the panel side 30a. A cylindrical flange 32 may be formed by or on the light pipe to engage panel side 30a, to accurately endwise position the light pipe relative to the panel.

Further positioning of the light pipe is afforded by an annular grip ring 35 extending closely about the light pipe to grip its outer surface at 10c. The grip ring is axially adjusted to cause the forward end 35a of the ring to engage the panel rearward side 30b, whereby the panel is retained between the ring and the flange 32. This also serves to axially space the panel relative to the circuit board, in a simple, predetermined, and effective manner. The grip ring may have serrations 38 at its bore, to frictionally engage the light pipe outer surface 10d, and block axial movement of the grip ring axially rightwardly relative to the light pipe, in FIG. 1.

The method of positioning a light pipe and light source, includes the steps:

a) providing a panel, b) assembling the light pipe to the panel to project through an opening in the panel, c) and assembling the light pipe and light source so that the light source projects into an end portion of the light pipe in spaced relation to the panel.

That end portion of the light pipe may define the concave recess 13, as referred to, to engage and optically axially align the light pipe and LED.

The method may also include providing grip structure gripping the light pipe, and providing a flange on the light pipe, and locating the panel to extend between said grip structure and flange, to be engaged thereby, for positioning the panel relative to a circuit board that carries the LED, as by surface mounting.

I claim:

1. A light transmission device, comprising in combination:
   a) a longitudinally axially extending light pipe having opposite ends,
   b) one of said ends defining a recess for reception of light source structure that transmits light into the light pipe, said recess having an interior concave wall, and said structure at least partly received in said recess to directly face said concave wall via which light is transmitted into the light pipe.

2. The combination of claim 1 wherein said concave wall extends about said light source structure received into the recess.

3. The combination of claim 2 wherein the recess defines a perimeter extending about the light source.

4. The combination of claim 3 including a circuit board to which the light source in the form of an LED is attached, the recess perimeter projects toward said board, sidewardly of the LED.

5. The combination of claim 1 wherein the opposite end of said light pipe defines light transmitting facets.

6. The combination of claim 5 wherein said facets extend in substantially circular arcs.

7. The combination of claim 1 including a support panel carrying the light pipe, in spaced relation to said recess.

8. The combination of claim 7 wherein the opposite end of the light pipe terminates proximate said panel.

9. The combination of claim 8 wherein said opposite end of said light pipe defines light transmitting facets.

10. The combination of claim 5 wherein said facets extend in substantially circular arcs.

11. The combination of claim 7 wherein the light pipe has a flange engaging one side of the panel, and there being a grip ring gripping the light pipe and engaging the opposite side of the panel.

12. The method of positioning a light pipe and light source that includes:
    a) providing a panel,
    b) assembling the light pipe to the panel to project through an opening in the panel, and
    c) assembling the light pipe and light source so that the light source projects into a recess at an end portion of the light pipe in spaced relation to the panel, so that the light source in the recess directly faces a concave interior wall defined by the light pipe, and positioning said concave interior wall to bound the light pipe in the recess.

13. The method of claim 12 including providing facets on an end of the light pipe proximate said panel.

14. The method of claim 12 including providing grip structure gripping the light pipe and providing a flange on the light pipe, and locating the panel to extend between said grip structure and flange, to be engaged thereby.

15. A light transmission device, comprising, in combination:
    a) a light pipe having opposite ends,
    b) one of said ends defining a recess via which light is transmitted into the light pipe to travel therein,
    c) the opposite end of the light pipe defining light transmitting structure,
    d) said recess having a substantially concave surface, there being LED structure at least partly received in said recess, and spaced from said substantially concave surface.

16. The combination of claim 15 wherein said structure defines facets.

17. The combination of claim 16 wherein said facets extend along ring-shaped paths.

18. The combination of claim 15 wherein said surface is a concave surface.

19. The combination of claim 18 wherein said substantially concave surface cooperates with said LED structure to axially mutually center said surface and said LED structure in said recess.

20. The combination of claim 15 including support structure supporting the light pipe at a side thereof, and spaced from said recess.

21. The combination of claim 20 wherein said light pipe projects beyond said support structure whereby said light pipe opposite end is everywhere spaced from said support structure.

22. The combination of claim 21 including a support panel engaged by said support structure at locations spaced sidewardly of the light pipe.

23. The combination of claim 21 including a support panel spaced from said opposite end of the light pipe, and engaged by said support structure at spaced locations for orienting the light pipe to extend in perpendicular relation to a plane defined by the panel.

24. The combination of claim 19 including a circuit board carrying said LED structure.

* * * * *